H. P. JUDSON.
Apparatus for the Manufacture of Fertilizers.
No. 217,877. Patented July 29, 1879.
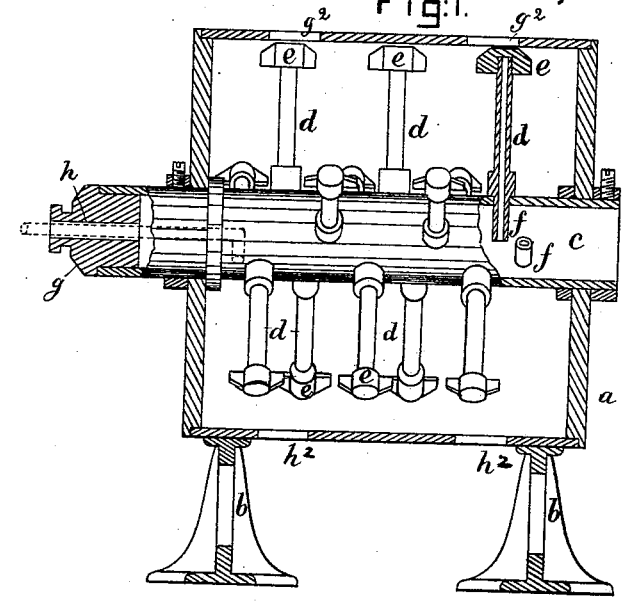
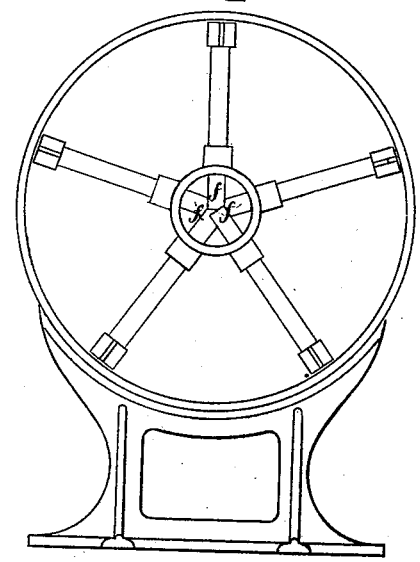
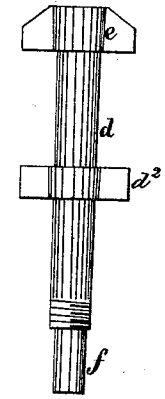
Witnesses.
Lawrence F. Connor.
Jos. P. Livermore
Inventor.
Henry P. Judson.
By Crosby & Gregory
Attys

UNITED STATES PATENT OFFICE.

HENRY P. JUDSON, OF BRIGHTON, MASSACHUSETTS.

IMPROVEMENT IN APPARATUS FOR THE MANUFACTURE OF FERTILIZERS.

Specification forming part of Letters Patent No. 217,877, dated July 29, 1879; application filed February 28, 1879.

*To all whom it may concern:*

Be it known that I, HENRY P. JUDSON, of Brighton, county of Suffolk, State of Massachusetts, have invented an Improvement in Mechanisms for Treating Animal Matter for the Production of Fertilizers, of which the following description, in connection with the accompanying drawings, is a specification.

This invention is an improvement upon the class of machine represented in United States Letters Patent No. 132,723, November 5, 1872, to which reference may be had.

In the practical operation of the apparatus described in the said patent it has been found that the connecting tubes or bars which join the hollow arms, as the shaft within the tank is rotated, are subjected to great strain by reason of pieces of bone, stone, or other foreign material, which wedge between the said tubes or bars and the inner surface of the tank, for which the said tubes or bars act as scrapers; and these long tubes or bars are also objectionable because of the increased power required to drag or move them through the mass of material in the tank.

In the operation of this old plan of apparatus the arms are frequently bent out of shape, and the horizontal tubes or bars connecting them are bent or broken, requiring the removal of the hollow shaft and arms from the tank for repair, entailing loss for cost of repairs and in time while the machine is idle. These tubes or bars, by forcing and crowding the hard or foreign materials against the interior of the tank, as described, wear the said tank unnecessarily and rapidly, causing it to leak.

Further, in practice it has been found that water of condensation settles and remains in the hollow shaft, filling its arms and tubes while they extend downward into the material in the tank, said arms and tubes so filled with water being cooled to a degree which would be impossible if the steam had free entrance into the said arms and the water of condensation could not collect, and consequently said arms are not kept at that degree of heat necessary for rapid and most effective work.

These difficulties experienced in the old form of apparatus are overcome in this my improved apparatus by the employment of hollow radial arms provided with shoes or stirrers, between which and the interior of the tank hard materials in the tank cannot be jammed, as in the old plan; and by extending the inner ends of the hollow arms within the hollow shaft, and providing the said hollow shaft with an outlet, as hereinafter described, water of condensation is effectually prevented from accumulating in the said hollow arms, and the full heat of the steam is utilized.

Figure 1 represents my improved apparatus in side elevation, the tank, its supports, part of the hollow shaft, and one of the hollow arms and shoes being in section. Fig. 2 is an end view of Fig. 1, the right-hand end of the tank being supposed to be removed; and Fig. 3 represents a modified form of arm and stirrer, to be hereinafter mentioned.

In the said drawings, $a$ represents a cylindrical tank or reservoir, in this case mounted on brackets $b$ to hold it firmly in an elevated position.

The agitator is composed of a hollow shaft, $c$, having its bearings at or near the center of the cylindrical tank, and of radially-projecting independent hollow arms $d$. Instead of the connecting bars or scrapers and connecting-tubes heretofore used, I provide each arm at its outer end with a shoe or head, $e$, which, preferably has, and will have, its ends round or oval, with wings extending on each side thereof, and tapered and made thin or wedging, so as to readily pass through and agitate, stir, or turn over and deflect to each side of the said shoes and arms the animal material (more or less thick and heavy) which is undergoing treatment.

The arms will, preferably, be arranged in such order and at such distances apart as that the end of one shoe or head will move partially through the same path with a shoe ahead of it in the direction of the rotation of the shaft, thereby preventing any material from settling at any one place in the tank or adhering to its inner surface, and at the same time be so arranged as not to drive the material spirally from one end of the tank to the other.

The shapes of the separate shoes may be varied without departing from my invention—as, for instance, they may be more or less oval, elliptical, or diamond shaped.

Additional projections or wings $d^2$ (see Fig.

3) may be attached to the said arms between the shaft and the inner shell of the tank, thereby increasing the agitation of certain kinds of material and enabling the steam generated in the mass of material to escape as the material is lifted and opened by the wings $d^2$.

Steam is introduced in proper quantities and under the desired pressure and heat and in any usual way into the hollow shaft $c$, from which it enters the hollow arms and heats them.

To prevent the water of condensation which flows into the hollow shaft from the uppermost hollow arms from flowing from the central hollow shaft into the hollow arms then below the shaft, or from one arm into another, I have extended the inner ends, $f$, of the arms $d$ into the said hollow shaft substantially to the center line or axis of the said shaft, as shown in the drawings, and I have provided the outlet $g$ of the shaft $c$ (shown in Fig. 1) with a discharge-passage, $h$, the inner surface of the walls of which is located at a distance from the center or axis of said shaft greater than the distance of the ends $f$ of the said arms from said center or axis. Consequently all water in the shaft will be at a level with the bottom of the outlet-passage, and will never rise high enough to run into the open ends of the hollow arms; but the latter, whether above or below the hollow shaft, will be equally in condition for the free admission of the steam.

When the tank is first set up the shaft will be run in one direction continuously; but as the inner surface of the tank at that quarter where the material is lifted by the arms from the bottom of the tank upward becomes worn the direction of rotation of the shaft will be reversed by crossing its driving-belt, or in any other usual manner, and then the opposite lower quarter of the tank will receive the wear.

After the two lower quarters of the tank have been worn as much as is practicable, the tank may be turned half-way around upon its supports $b$, bringing its upper half in position to bear upon the supports $b$, after which, by turning the shaft $c$ in opposite directions, as before described, each quarter of the tank then lowermost may be made to receive its full amount of wear.

The holes $g^2$ $g^2$ $h^2$ $h^2$ are made opposite each other, so that the uppermost holes may be used as feeding-openings and for discharge of steam and gases, while the lowermost openings serve for the discharge of the dried material.

The independent hollow arms would be serviceable if simply closed at their outer ends, the shoes being then omitted, and so the hollow arms and shoes would operate if the inner ends of the arms were not extended, as described, within the hollow shaft; but it is preferred to always extend the said arms into the said shaft, as described.

Instead of the discharge-opening $h$ shown for the water of condensation, as above described, I may employ a pipe having an opening of smaller diameter, the inner end of the pipe being bent downward, as shown in dotted lines, Fig. 1.

I claim—

1. In an apparatus for treating animal matter for fertilizers, a hollow shaft, combined with hollow arms extended into and substantially to the center of the said hollow shaft, as and for the purpose described.

2. The independent hollow arm closed at its outer end, fitted into the central hollow shaft, and extended from the axial center of said shaft substantially to the inner surface of the cylindrical tank, combined with the cylindrical tank, substantially as described.

3. In an apparatus for treating animal matter for fertilizers, the central hollow shaft and hollow arms extended within the said shaft substantially to its center or axis of rotation, combined with an outlet-pipe provided with a discharge-passage, the inner surface of which is at a greater distance from said center or axis than are the inner ends of said extended hollow arms, substantially as and for the purpose described.

4. In an apparatus for treating animal matter for fertilizers, the cylindrical tank and hollow shaft to receive steam, and provided with an outlet, such as described, for water of condensation, combined with a series of hollow independent radial arms and shoes or heads to operate upon, stir, agitate, and deflect the material within the tank and to clean its inner surface, substantially as described, the inner ends of the said arms being extended into the hollow shaft substantially to its center or axis of revolution, to permit them to be kept free from water of condensation, to thereby thoroughly distribute the heat of the steam through all parts of the material being dried in the cylindrical tank.

In testimony whereof I have signed my name to this specification in the presence of two subscribing witnesses.

HENRY P. JUDSON.

Witnesses:
G. W. GREGORY,
L. F. CONNOR.